United States Patent [19]

Marshall

[11] 3,816,670

[45] June 11, 1974

[54] LINE CARD CIRCUIT FOR A KEY TELEPHONE SYSTEM

[75] Inventor: Richard A. Marshall, Elmhurst, Ill.

[73] Assignee: GTE Automatic Electric Laboratories Incorporated, Northlake, Ill.

[22] Filed: Dec. 26, 1972

[21] Appl. No.: 318,143

[52] U.S. Cl. .................................................. 179/99
[51] Int. Cl. ........................................... H04m 1/00
[58] Field of Search .... 179/81 R, 81 C, 84 R, 84 L, 179/18 F, 99, 18 FA

[56] References Cited

UNITED STATES PATENTS 3,748,405 7/1973 Saba .................................... 179/99

*Primary Examiner*—Thomas A. Robinson
*Attorney, Agent, or Firm*—Robert J. Black

[57] ABSTRACT

A line card circuit for a key telephone system in which means are provided for sensing ringing current on the line conductors the card is connected to. Also included are means to connect audible and visual signal equipment and to effect placement of the connected line in a hold condition.

4 Claims, 1 Drawing Figure

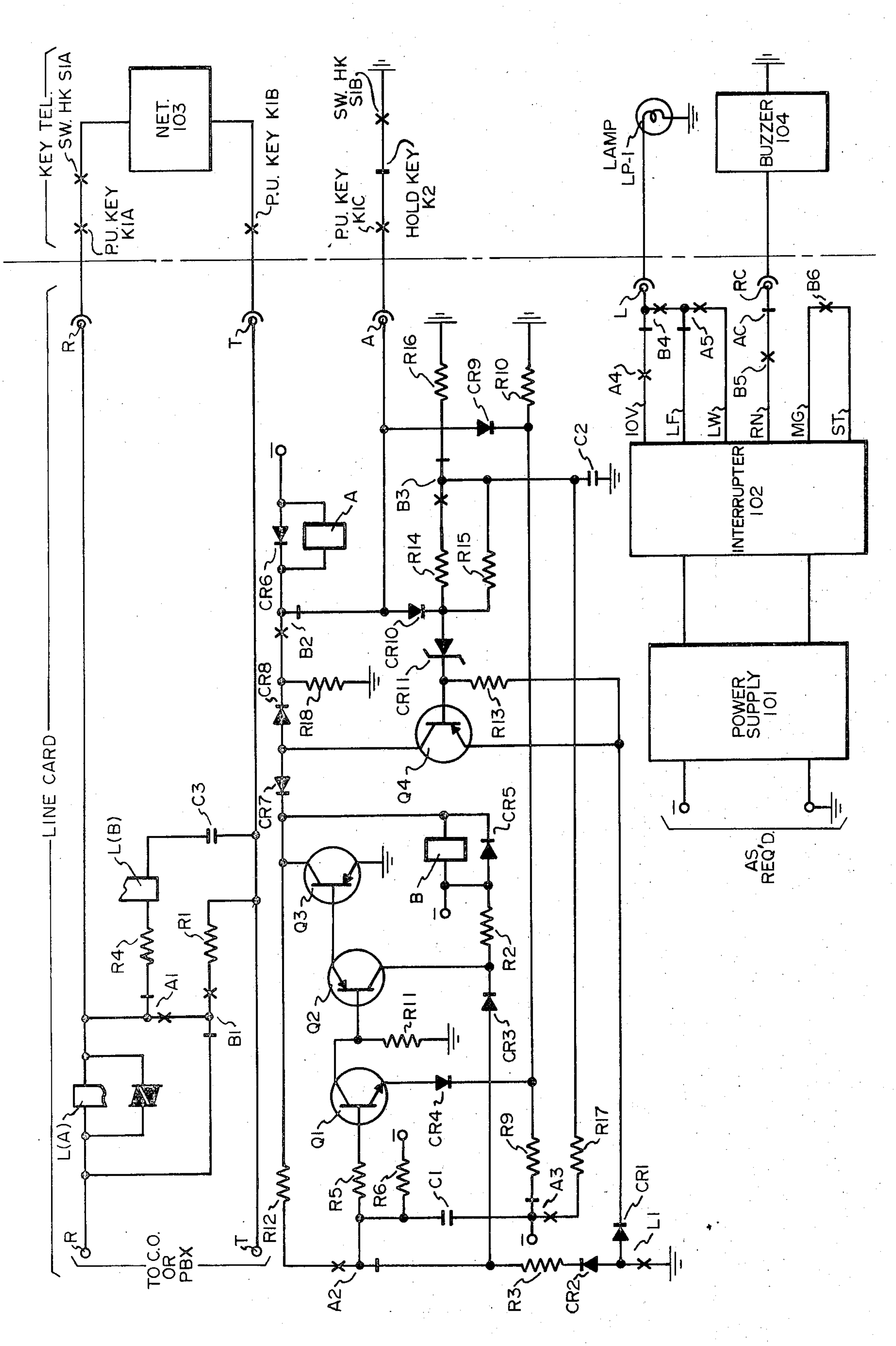
KEY TEL.
SW. HK S1A
NET. 103
P.U. KEY K1A
P.U. KEY K1B
SW. HK S1B
HOLD KEY K2
P.U. KEY K1C
LAMP LP-1
BUZZER 104
LINE CARD
TO C.O. OR PBX
INTERRUPTER 102
POWER SUPPLY 101
AS REQ'D.
10V
LF
LW
RN
MG
ST

LINE CARD CIRCUIT FOR A KEY TELEPHONE SYSTEM

BACKGROUND OF THE INVENTION

1. Field of the Invention

This invention relates to telephone systems and more particularly to subscriber operated telephone equipment generally known as key telephone switching systems.

2. Description of Prior Art

Key telephone systems are systems controlled by the subscriber which permit the use of one or more subscriber station sets with a plurality of telephone lines by permitting selective switching of one line or another to the subscriber station. Key telephone switching systems provide a variety of control and supervisory functions necessary for the utilization of several telephone lines by each multi-line subscriber station.

In the present day subscriber's key telephone system each telephone line controlled by a multi-line subscriber station set has associated therewith a line card. Each line card contains the necessary circuitry to perform the desired switching and supervisory functions required by the associated line regardless of how many station sets have access to the line. These functions include audible and/or visual signals to the subscriber in addition to the detection of ringing current received from a central office or a private branch exchange switching system. Also provided is the ability to place a "hold" condition on the line so that the subscriber may use his subset for another line without losing the call, the detection of the abandonment of an incoming call and a consequent returning of the line card to an idle condition, the answering of an incoming call by allowing a subset connection to the incoming call line and call origination from the subscriber station by seizure of a selected line.

Because of the variety of functions to be performed each line card circuit is usually limited in its operation to a single line. With the considerably expanded utilization of key telephone units and associated multiple line facilities, it is highly desirable to reduce the complexity, size and cost of such line cards while increasing the reliability of the circuitry contained thereon. Present line cards, while satisfactory for utilization in most key switching systems, suffer from a variety of problems.

Originally line cards utilized four or more relays to sense the presence of ringing signals associated with an incoming call and perform the various required switching and holding operations. Such multiple relay sensing and switching circuits because of the quantity of relays involved are large in size and the operate and release times of the relays limit the speed of the switching operations. To overcome the deficiencies of multiple relay line circuits, transistorized sensing and switching circuits or hybrids employing both transistors and relays have become more or less standard. Such units are disclosed in U.S. Pat. Nos. 3,239,610 to C. E. Morse et al, 3,436,488 to R. E. Barbato et al., 3,647,983 and 3,649,772 both to A. R. Fitzsimons et al. While such units do reduce the physical size of line card units, they too, produce a variety of problems. Such problems include increase of the total number of components and a tendency towards false ringing. Certain of the designs shown in the above patents also include a certain percentage of transmission loss through the line card, a susceptibility to damage caused by lightning and on incoming calls the timeout interval is dependent on the number of previous rings. Other problems inherent in prior art line cards include a tendency to give false incoming call indications because of power line transients and poor voice transmission properties because of insertion loss and longitudinal unbalance.

SUMMARY OF THE INVENTION

The present invention comprises a novel line card circuit for use with a multi-line subscriber's key telephone, located at the subscriber's premises to perform all the necessary sensing and switching functions. Sensing means are provided to detect the presence of ringing signals on the line conductors coming from a telephone central office or private branch exchange. The sensing means comprises a double winding relay with both windings connected in series during the ringing operation. While readily responding to ringing signals, the sensing relay is not sensitive to telephone line or supply voltage transients.

Means are further included operative in response to the operation of the sensing relay, but electrically isolated from line ringing signals to provide signals to lamps and/or buzzers associated with each key telephone connected to the present line card. A holding resistance is also included in the line card, that is readily connectable across the line conductors in response to the subscriber placing the line in the hold condition in order to answer another call. This placement of the holding resistance across the line conductors in a bridging configuration prevents the loss of the connected call.

Means are included when the subscriber answers an incoming call to effectively shunt the sensing relay eliminating insertion loss and longitudinal unbalance and at the same time extinguishing the audible signal and changing the visual signal from a characteristic flashing lamp signal to a steady lamp signal indicating the presence of a completed circuit connection between the subscriber's telephone set and the central office or private branch exchange. Operation of a hold key associated with the subscriber station not only causes placement of the holding bridge referred to above but also causes the visual signal to change from a steady lamp to a winking lamp signal which is operated at a characteristic rate different from the flashing lamp signal associated with an incoming call. The subscriber reconnects his telephone to a held line in the same manner as answering an incoming call.

In the present invention the line card circuit is of the hybrid type utilizing both relays, transistors and associated circuit components. The circuit design is such that such features as good voice transmission properties, more stable time out interval lengths, faster switching times and prevention of false operation are all included while circuit components are essentially no greater in number than that of prior art designs.

BRIEF DESCRIPTION OF THE DRAWING

The single FIGURE of drawings appended hereto is a schematic circuit diagram of a line card circuit constructed in accordance with the principles of the present invention, shown connected to a single key telephone and to a power supply and interrupter circuit of conventional construction and well-known in the prior art, which provide the necessary power and supervisory signals for use with the present invention. While but a single key telephone is shown connected to the line card, it is to be understood that a plurality of telephones may be connected thereto and that only those portions of the key telephone that are required for operation of the present invention are shown. The remaining portions not shown for the sake of convenience and clarity in description of the present invention are all well-known in the art.

It should also be noted that the relay and key circuitry included in the present drawing are in accordance with the technique referred to as detached contact circuitry. In the detached contact form of circuitry the contacts associated with a particular relay coil are distributed throughout the circuit drawing but are identifiable by a letter prefix designation similar to that of the relay coil. An "X" crossing a circuit lead indicates a make contact while a short single line perpendicular to a circuit lead indicates a break contact in this format.

DESCRIPTION OF THE PREFERRED EMBODIMENT

Referring now to the single FIGURE of drawings a subscriber's key telephone is shown connected via the line card of the present invention to a telephone central office or private branch exchange. As noted above, only those portions of the subscriber's key telephone whose operation is associated with the present line card circuitry are shown. These include a telephone transmission network 103 connected across the T and R leads extending to the central office and include in the R lead, pick-up key contacts K1A and switch hook contacts S1A while included in the T lead connection are pick-up key contacts K1B. Also included and connected to the supervisory or A lead are pick-up key contacts K1C, switch hook contacts S1B and a hold key K2. Further shown is a visual indicating lamp LP1 and a buzzer 104. It should be understood that the buzzer 104, as an audible signal device, is an arbitrary selection and a conventional telephone ringer could be substituted at this point. Also connected to the line card circuitry is power supply 101 connected to interrupter 102. Power supply 101 provides the necessary operating potentials for use with the line card, interrupter 102 and the associated key telephone. Interrupter 102 provides the specific signaling potentials connected through the line card to the audible and visual signaling devices included in the subscriber's key telephone.

The line card circuitry itself shown in schematic form includes line sensing relay L, which is a two winding relay, relay B which operates during ringing and during the hold operation, and relay A which operates during the "off-hook" or operated condition and is also operated during the holding condition. Associated with the operation of relay B are transistors Q1, Q2 and Q3 and their associated biasing circuitry. Transistor Q4 is also utilized to operate relay B and subsequently relay A during the holding operation.

For the best understanding of the present invention, operation of the circuitry during the various functions associated with the key telephone will be described.

Initially, when the circuit is idle, all relays are in their restored or normal condition while all transistors are in their OFF condition and capacitors C1 and C2 are discharged. It should be assumed that any subscriber's key telephone sets connected to the line card are in the on-hook condition and the supervisory lamp LP1 is dark and the A lead is disconnected from ground because pick-up key contact K1C is not operated.

When an incoming call is received from the telephone central office or private branch exchange, ringing current will be applied to conductors T and R and current will flow through both coils of relay L over a path that may be traced from terminal R extending to the central office or private branch exchange through the upper coil of relay L (A) through break contact A1, resistor R4 and the second or lower coil L (B) and then through capacitor C3 to the conductor extending to terminal T connected to the telephone line extending to the central office or private branch exchange.

In response to this ringing voltage contacts L1 of relay L will close and open during each half cycle of ringing, causing capacitor C1 to charge over a path extending from ground through contacts L1, diode CR2, resistor R3, break contacts A2 and capacitor C1 to battery. When the voltage of capacitor C1 exceeds about half the normal power supply voltage, transistor Q1 will be turned ON at its base lead through resistor R5. Operation of transistor Q1 is effective to turn ON transistor Q2 which in turn turns transistor Q3 ON. When transistor Q3 turns ON relay B operates. Operation of relay B at contacts B6 turns on interrupter 102 and at make contacts B5 extends ringing potential to buzzer 104 included in the subscriber's key telephone subsets. At contacts B4 flashing lamp potential is extended to lamp LP1 causing it to flash at a rate indicative of an incoming call. Capacitor C1 continues to charge during ringing, maintaining a charge level satisfactory to keep transistor Q1 in conduction therefore causing transistors Q2 and Q3 to remain ON and relay B to remain operated. At this point the presence of an incoming call is indicated at each key telephone connected to the present line card by virtue of the flashing lamp and buzzer signals.

If the incoming call should become abandoned before the subscriber may answer the call, such as happens when the calling party of the central office or private branch exchange goes back "on-hook," capacitor C1 will start to discharge after the last ring. When the charge level drops to about half the supply voltage transistor Q1 will turn OFF, in turn turning transistors Q2 and Q3 also OFF and restoring relay B to normal and hence restoring the line card to its idle condition.

To answer the incoming call, the subscriber will at one of the key telephones connected to the present line card go off-hook operating switch hook contacts S1A and S1B as well as operating pick-up key K1 completing connections between the conductors extending to the telephone central office at contacts K1A and K1B and completing the supervisory path at contacts K1C. Operation of the switch hook contacts and the pick-up key will place the transmission network 103 across the station leads R and T, which will cause ringing signals to cease at the central office or private branch exchange. The connection of the ground to the A lead causes the extension of ground through diode CR9 and places a reverse bias on transistor Q1's emitter through diode CR4. This causes transistors Q1, Q2 and Q3 to turn OFF and restores relay B. The restoration of relay B will stop the flashing lamp signal as well as stop the audible signals from buzzer 104. Relay A is now connected to the A lead through break contact B2 as soon as relay B restores. This will cause relay A to operate.

When relay A operates at its make contacts A4 a steady potential will be extended to supervisory lamp LP1 and at make contacts A1 a shunt will be completed from the R terminal extending to the central office around the upper winding of relay L (A) and at the break contact A1 a path to the lower winding will be broken. Operation of relay A also will cause by virtue of operation of contacts A3 the charging of capacitor C2. At this point conversation between a subscriber at a key telephone subset connected to the present line card and the subscriber initiating the incoming call may commence.

If the subscriber desires to place the line on hold, he will operate hold key K2 removing ground from terminal A. This will cause the restoration of relay A, removing the shunt from the upper winding of relay L (A) and permitting the capacitor C2 to start to discharge through resistor R16. Relay L at its upper winding L (A) will now operate from loop current from the telephone central office or private branch exchange extending through the transmission network 103. With the operation of relay L, at contacts L1 operating current will be provided for transistor Q4 to be turned on by current through resistor R15 and diode CR11 and maintained in the ON condition by capacitor C2. Current from transistor Q4 will operate relay B. A path is then connected for transistor Q4 to operate relay A at make contacts B2 associated with relay B. When relay A operates, resistor R1 is now connected across the line through make contacts A1 and B1, to maintain loop current. This is the holding bridge required to hold a circuit connection to the telephone central office or private branch exchange. Operation of make contacts A5 and B4 combine to provide the lamp wink signal to lamp LP1 providing an indication of the hold condition and capacitor C2 will be recharged by the reoperation of make contacts A3.

Current is prevented from flowing through transistor Q1 by operation of break contact A3 and thus transistor Q2 and Q3 will be retained in their OFF condition. Capacitor C1 is connected across relay B via resistance R12 at make contacts A2 and is thus charged. The telephone line associated with the line card is now in the hold condition.

Should the subscriber wish to reanswer a line in the hold condition, the hand set associated with the key telephone must be removed from the switch hook to operate switch hook contacts S1A and S1B and the pickup key K1 must also be operated to reconnect the subscriber's telephone to the line in the hold condition. The operation of switch hook contacts S1A and pickup key contacts K1A and K1B will reconnect the key telephone network 103 to the telephone line. Operation of the switch hook S1B contacts and pick-up key K1C contacts reconnect ground to terminal A. This ground will be conducted through diode CR10 which will act to turn transistor Q4 OFF. Relay A, however, will be held operated by ground through resistor R18 and previously operated make contacts B2. Relay B is held operated momentarily by the charge on capacitor C1 assuring that the holding resistor R1 will remain across the line until after the key telephone's network 103 is replaced across the line. When relay B restores, at break contacts B2 it will cause the reconnection of relay A to the grounded lead connected to terminal A, maintaining relay A in the operated condition. With operation of relay A and restoration of relay B the shunt path around relay L upper winding L (A) is recreated and the path to lower winding L (B) is broken at break contacts A1. The lamp LP1 will again operate on a steady basis in response to potential through contacts A4

If while a line is in the held condition, and a central office or private branch exchange subscriber desires to terminate the call, the circuitry of the present line card is able to release the held line when the central office or private branch exchange momentarily opens the loop. When this takes place relay L which has been held operated by virtue of loop potential through its upper winding L (A), will restore removing operating potential at contacts L1 from transistor Q4. Resistor R18 will hold relay A operated and as previously outlined relay B will be held momentarily by capacitor C1. After a short period of time relay B will restore and relay A will be disconnected at make contacts B2 from resistor R18 and thus will also restore. At this point all the relays included in the present line card circuit will have been restored and all transistors will return to their OFF condition. The restoration of both relays A and B will at contacts B4 and A5 remove the lamp wink signal from lamp LP1 and lamp LP1 will revert to its extinguished or off-state. This serves as an indicator to the subscriber that the central office or PBX connection no longer exists.

When a subscriber at the associated key telephone connected to the present line card wishes to release a connected line, restoration of pick-up key K1 will at contacts K1A and K1B disconnect the network 103 from the line, eliminating loop current. Likewise at contacts K1C ground will be eliminated from terminal A. Alternately, restoration of switch hook contacts S1A and S1B will also release the line. In this manner relay A will restore, returning the line card to the idle condition in a manner similar to that outlined above. Capacitor C2 also discharges through resistor R16 so that transistor Q4 will remain OFF when the next incoming call occurs.

When the line card is in the idle condition, if a subscriber at the associated key telephone subscriber's unit desires to initiate a call, he will operate the pick-up key and at contacts K1A, K1B and K1C complete the circuit connections outlined above as well as remove the handset from the hook switch to further complete the circuitry at switch hook contacts S1A and S1B. The placement of ground on terminal A will cause operation of relay A which in turn will at make contacts A1 and break contacts B1 shunt the upper winding L (A) and break the connection to the lower winding L (B) respectively of relay L and cause the charging of capacitor C2 at make contacts A3. A steady lamp signal will be sent to the lamp at the subscriber's unit by virtue of operation of make contacts A4. At this point dial tone should normally be returned from the telephone central office or private branch exchange to be heard by the subscriber in his handset (not shown) after which he may initiate a call by operating a calling device (not shown) associated with the subscriber's key telephone unit.

While but a single embodiment has been shown in the present invention it should be obvious to those skilled in the art that numerous modifications and variations on the present design may be made without departing from the spirit and scope of the present invention which is limited solely by the claims appended hereto.

What is claimed is:

1. A telephone line circuit for use with telephone systems including at least one key telephone subscriber's set and a pair of line conductors to which ringing signals and line current are applied and which are adapted to be connected through said key telephone set by operation thereof, said telephone line circuit comprising: first means comprising a multi-winding first relay normally connected with said windings in series between said line conductors, said first relay initially operated in response to alternating current ringing signals applied to said line conductors and conducted over said conductors to said serially connected relay windings; second means including a second relay connected to said first relay, operated in response to said operated first relay, to enable audible and visual indicators at said key telephone subscriber's set.

2. A telephone line circuit as claimed in claim 1 wherein: said second means further include at least a first transistor connected between said first relay and said second relay, said first transistor rendered conductive in response to operation of said first means and said second relay operated in response to said first transistor being rendered conductive.

3. A telephone line circuit as claimed in claim 1 wherein: in response to initial operation of said key telephone subscriber's set said second means are rendered inoperative to disable said audible and visual indicators; and there is further included third means including a third relay, also operated in response to said initial operation of said key set, to render said first relay inoperative and to reenable said visual indicator in a second manner distinct from said original enablement.

4.A telephone line circuit as claimed in claim 3 wherein: there is further included a second transistor connected between said first relay and said second and third relays, and in response to further operation of said key telephone subscriber set, said third means rendered inoperative thereby rendering said first relay reoperable; said fist relay re-operated in response to line current applied to said line conductors; said second transistor rendered conductive in response to said re-operation of said first relay thereby re-operating said second means, said third means re-operated in response to said re-operation of said second means and said second transistor being rendered conductive, said re-operation of said second means and said third means in combination effective to connect a bridge circuit between said line conductors, shunting said key telephone subscriber's set; said reenablement of said second means and said third means in combination further effective to disable said visual indicator operation in said second manner and reenable said visual indicator in a third manner distinct from said second manner and from said original enablement.

* * * * *